United States Patent
Wang et al.

(10) Patent No.: US 12,095,695 B2
(45) Date of Patent: Sep. 17, 2024

(54) SOUNDING REFERENCE SIGNAL TRANSMISSION METHOD AND APPARATUS, COMMUNICATION NODE DEVICE AND STORAGE MEDIUM

(71) Applicant: ZTE Corporation, Guangdong (CN)

(72) Inventors: Yuxin Wang, Guangdong (CN); Zhaohua Lu, Guangdong (CN); Chuangxin Jiang, Guangdong (CN); YuNgok Li, Guangdong (CN); Zhen He, Guangdong (CN)

(73) Assignee: ZTE Corporation, Shenzhen (CN)

(*) Notice: Subject to any disclaimer, the term of this patent is extended or adjusted under 35 U.S.C. 154(b) by 559 days.

(21) Appl. No.: 17/290,744

(22) PCT Filed: Nov. 4, 2019

(86) PCT No.: PCT/CN2019/115327
§ 371 (c)(1),
(2) Date: Apr. 30, 2021

(87) PCT Pub. No.: WO2020/088686
PCT Pub. Date: May 7, 2020

(65) Prior Publication Data
US 2022/0006588 A1  Jan. 6, 2022

(30) Foreign Application Priority Data
Nov. 2, 2018  (CN) .......................... 201811302863.9

(51) Int. Cl.
*H04L 5/00* (2006.01)
*H04L 25/02* (2006.01)
(Continued)

(52) U.S. Cl.
CPC .......... *H04L 5/0051* (2013.01); *H04L 5/0012* (2013.01); *H04L 5/0048* (2013.01);
(Continued)

(58) Field of Classification Search
CPC ................. H04L 5/0051; H04L 5/0012; H04L 25/0226; H04L 5/0094; H04L 5/0048;
(Continued)

(56) References Cited

U.S. PATENT DOCUMENTS

2015/0071196 A1* 3/2015 Park ...................... H04W 72/21
370/329
2017/0048039 A1* 2/2017 Zhao ......................... H04L 5/14
(Continued)

FOREIGN PATENT DOCUMENTS

CN          104168656 A      11/2014
WO     WO 2013/010030 A1     1/2013
(Continued)

OTHER PUBLICATIONS

Chinese Office Action dated Mar. 3, 2022, in connection with Chinese Application No. 201811302863.9.
(Continued)

*Primary Examiner* — Jae Y Lee
*Assistant Examiner* — Aixa A Guadalupe Cruz
(74) *Attorney, Agent, or Firm* — Wolf, Greenfield & Sacks, P.C.

(57) ABSTRACT

Provided are a sounding reference signal transmission method and apparatus, a communication node device and a storage medium, wherein configuration information of each sounding reference signal symbol in an uplink subframe may be determined according to configuration signaling information and/or a predefined rule; and each sounding reference signal symbol is transmitted according to the configuration information.

15 Claims, 2 Drawing Sheets

Determine configuration information of respective SRS symbols in an uplink subframe according to at least one of configuration signaling information or a predefined rule — S101

Transmit the SRS symbols according to the configuration information — S102

(51) Int. Cl.
*H04W 72/0446* (2023.01)
*H04W 72/23* (2023.01)
*H04W 72/53* (2023.01)

(52) U.S. Cl.
CPC ..... *H04L 25/0226* (2013.01); *H04W 72/0446* (2013.01); *H04W 72/23* (2023.01); *H04W 72/53* (2023.01)

(58) Field of Classification Search
CPC ............ H04L 5/0007; H04W 72/0446; H04W 72/23; H04W 72/53
See application file for complete search history.

(56) References Cited

U.S. PATENT DOCUMENTS

| | | | |
|---|---|---|---|
| 2017/0150499 | A1 | 5/2017 | Kim et al. |
| 2020/0322187 | A1* | 10/2020 | He .................... H04W 72/0446 |
| 2021/0075646 | A1* | 3/2021 | Yum .................... H04B 1/7143 |
| 2021/0226821 | A1* | 7/2021 | Liu .................... H04W 72/0446 |

FOREIGN PATENT DOCUMENTS

| | | | |
|---|---|---|---|
| WO | WO 2014/019213 | A1 | 2/2014 |
| WO | WO 2017/132964 | A1 | 8/2017 |
| WO | WO 2018/053755 | A1 | 3/2018 |
| WO | WO 2018/118532 | A1 | 6/2018 |
| WO | WO 2020/069277 | A1 | 4/2020 |

OTHER PUBLICATIONS

Indian Office Action dated Feb. 24, 2022, in connection with Indian Application No. 202127024503.

[No Author Listed] UL SRS design for beam management and CSI acquisition, 3GPP TSG RAN WG1 NR Ad Hoc Meeting, Jun. 27-30, 2017, 8 pages.

[No Author Listed] Corrections SRS dropping in CA in 36.213, 3GPP TSG RAN WG1 Meeting #84bis, Apr. 11-15, 2016, 9 pages.

International Search Report mailed Feb. 20, 2020 in connection with International Application No. PCT/CN2019/115327.

[No Author Listed], Additional SRS symbols. 3GPP TSG-RAN WG1 Meeting #94bis. R1-1811656. Qualcomm Incorporated. Oct. 2018. 9 pages.

[No Author Listed], Enhancements on SRS resource allocation. 3GPP TSG RAN WG1 Meeting #94bis. R1-1810246. LG Electronics. Oct. 2018. 6 pages.

[No Author Listed], Feature summary on additional SRS symbols for LTE. 3GPP TSG RAN WG1 Meeting #94bis. Huawei, HiSilicon. Oct. 2018. 6 pages.

[No Author Listed], Further discussion on SRS enhancements. 3GPP TSG RAN WG1 Meeting #94bis. R1-1810360. Vivo. Oct. 2018. 4 pages.

Extended European Search Report mailed Jun. 28, 2022, in connection with European Application No. 19878761.6.

[No Author Listed], 3GPP TSG-RAN WG1 Meeting #94. R1-1809037. Qualcomm Incorporated. Aug. 2018. 5 pages.

[No Author Listed], 3GPP TSG-RAN WG1 Meeting #94bis. R1-1810930. Qualcomm Incorporated. Oct. 2018. 2 pages.

Korean Office Action dated Apr. 8, 2024, in connection with Korean Application No. 10-2021-7016959, with English translation thereof.

[No Author Listed], 3GPP TSG-RAN WG1 Meeting #94. R1-1809038. Qualcomm Incorporated. Aug. 20-24, 2018. 2 pages.

[No Author Listed], 3GPP TSG-RAN WG1 Meeting #94. R1-1808369. Consideration on multiple SRS Symbols in a subframe. Qualcomm Incorporated. Aug. 20-24, 2018. 3 pages.

* cited by examiner

SOUNDING REFERENCE SIGNAL TRANSMISSION METHOD AND APPARATUS, COMMUNICATION NODE DEVICE AND STORAGE MEDIUM

CROSS REFERENCES TO RELATED APPLICATIONS

This Application is a national stage filing under 35 U.S.C. § 371 of International Patent Application Serial No. PCT/CN2019/115327, filed Nov. 4, 2019, entitled "SOUNDING REFERENCE SIGNAL TRANSMISSION METHOD AND APPARATUS, COMMUNICATION NODE DEVICE AND STORAGE MEDIUM". Foreign priority benefits are claimed under 35 U.S.C. § 119(a)-(d) or 35 U.S.C. § 365(b) of Chinese application number 201811302863.9, filed Nov. 2, 2018. The entire contents of these applications are incorporated herein by reference in their entirety.

TECHNICAL FIELD

The present disclosure relates to the technical field of communications.

BACKGROUND

A sounding reference signal (SRS) is a signal used between a second communication node device (for example, a user device (UE)) and a first communication node device (for example, an e-Node-B (eNB)) to measure channel state information (CSI). In an LTE system, the UE periodically sends an uplink SRS on the last data symbol in a sending subframe according to parameters, indicated by the eNB, such as a frequency band, a frequency domain location, a sequence cyclic shift, a period, and a subframe offset. The eNB determines the uplink CSI of the UE according to the received SRS, and performs operations such as frequency domain selection scheduling, closed loop power control according to the obtained CSI.

In order to enhance the capacity and coverage of the SRS, one considered way involves introducing multiple SRS symbols into a normal subframe. However, once the multiple SRS symbols are introduced into the uplink subframe, how to configure transmission for the introduced multiple SRS symbols becomes an urgent problem to be solved.

SUMMARY

According to an aspect of an embodiment of the present disclosure, a sounding reference signal (SRS) transmission method is provided. The method includes: determining, according to at least one of configuration signaling information or a predefined rule, configuration information of respective SRS symbols in an uplink subframe; and transmitting the respective SRS symbols according to the configuration information.

According to another aspect of an embodiment of the present disclosure, an SRS transmission device is provided. The device includes: a determination module and a transmission module. The determination module is configured to determine, according to the at least one of the configuration signaling information or the predefined rule, the configuration information of the respective SRS symbols in the uplink subframe; and the transmission module is configured to transmit, according to the configuration information, the respective SRS symbols.

According to another aspect of an embodiment of the present disclosure, a communication node device is provided. The communication node device includes a processor, a memory, and a communication bus. The communication bus is configured to connect the processor and the memory; and the processor is configured to execute a computer program stored in the memory to implement the steps of the above-mentioned SRS transmission method.

According to another aspect of an embodiment of the present disclosure, the embodiment of the present disclosure further provides a computer-readable storage medium, which is configured to store one or more computer programs executable by one or more processors to implement the steps of the above-mentioned SRS transmission method.

According to the SRS transmission method and device, the communication node device, and the storage medium which are provided by the embodiments of the present disclosure, for the respective SRS symbols in the uplink subframe, the configuration information of the respective SRS symbols in the uplink subframe may be determined between a first communication node and a second communication node according to the at least one of the configuration signaling information or the predefined rule, and SRS symbols are further transmitted according to the configuration information, so that the capacity and coverage of the SRS are improved.

DETAILED DESCRIPTION

In order for the object, solution and advantages of the present disclosure to be more apparent, embodiments of the present disclosure are further described below in detail in conjunction with implementations and drawings. It is to be understood that the embodiments described herein are merely intended to explain the present disclosure and not to limit the present disclosure.

Figure 1:
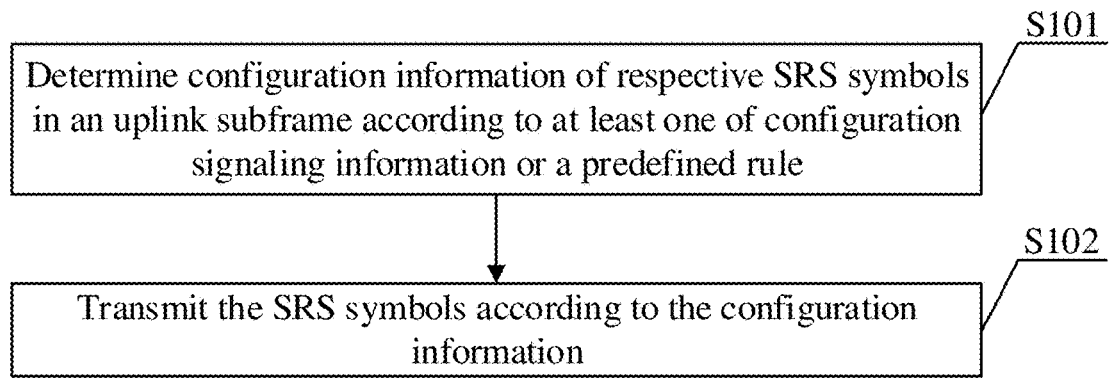
FIG. 1 is a flowchart of an SRS transmission method according to an embodiment of the present disclosure.

An embodiment of the present disclosure provides a sounding reference signal (SRS) transmission method, which is applicable to, but not limited to, a scenario in which multiple SRS symbols are introduced into an uplink subframe. As shown in FIG. 1, the SRS transmission method may include steps S101 to S102.

In step S101, configuration information of respective SRS symbols in an uplink subframe is determined according to at least one of configuration signaling information or a predefined rule.

It is to be understood that reference signals in the embodiment of the present disclosure are not limited to the SRS and may be other reference signals depending on specific application scenarios.

According to the embodiment provided by the present disclosure and according to specific requirements, the configuration information of the respective SRS symbols in the uplink subframe may be determined flexibly according to the configuration signaling information; the configuration information of the respective SRS symbols in the uplink subframe may be determined flexibly according to the predefined rule; or the configuration information of the respective SRS symbols in the uplink subframe is determined according to the configuration signaling information and the predefined rule.

According to the embodiment provided by the present disclosure, in response to the method including that the configuration information of the respective SRS symbols in the uplink subframe is determined according to the predefined rule, the predefined rule may be a pre-negotiated (that is, pre-defined) rule between a first communication node device and a second communication node device.

According to the embodiment provided by the present disclosure, in response to the method including that the configuration information of the respective SRS symbols in the uplink subframe is determined according to the configuration signaling information, the configuration signaling information may be configuration signaling information sent by the first communication node device to the second communication node device, and a specific type of the configuration signaling information may be flexibly selected according to specific application scenarios.

According to the embodiment provided by the present disclosure, the first communication node device may include, but is not limited to, a base station of a macro cell, a base station or a transmission node device of a small cell, a sending node device in a high-frequency communication system, a sending node device in an Internet of Things system, and the like. The second communication node device may include, but is not limited to, a user equipment (UE), various portable devices, and node devices in various communication systems such as automobile communication systems.

In step S102, the SRS symbols are transmitted according to the configuration information.

According to the embodiment provided by the present disclosure, the step in which the SRS symbols are transmitted according to the configuration information may include, but is not limited to: the second communication node device may send the SRS symbols to the first communication node device according to the configuration information; and the first communication node device may receive the SRS symbols sent by the second communication node device according to the configuration information. According to the embodiment provided by the present disclosure, after receiving the SRS symbols, the first communication node device may further perform corresponding processing on the SRS symbols.

In some application examples (such as LTE-A Release 14, but not limited to LTE-A Release 14), the SRS symbols in the uplink subframe may include, but are not limited to, a legacy SRS symbol and an additional SRS symbol.

According to the embodiment provided by the present disclosure, the legacy SRS symbol is an SRS symbol on a last symbol (in some exemplary embodiments, the last symbol may be a data symbol) in the uplink subframe; and the additional SRS symbol is an SRS symbol on a symbol (in some example embodiments, such symbol may be a data symbol) in the uplink subframe other than the last symbol.

According to the SRS transmission method provided by the embodiment of the present disclosure, the configuration information of the legacy SRS symbol and the additional SRS symbol in the uplink subframe may be determined between the first communication node device and the second communication node device through the at least one of the configuration signaling information or the predefined rule, and the legacy SRS symbol and the additional SRS symbol in the uplink subframe may be respectively received and sent based on determined configuration information, so as to satisfy the requirement of introducing multiple SRS symbols into one uplink subframe to enhance SRS capacity and SRS coverage.

For ease of understanding, the embodiment is described below with examples to illustrate determining the configuration information of the respective SRS symbols in the uplink subframe according to the at least one of the configuration signaling information or the predefined rule.

According to the embodiment provided by the present disclosure, the step in which the configuration information of the respective SRS symbols in the uplink subframe is determined according to the at least one of the configuration signaling information or the predefined rule may include, but is not limited to, that an SRS parameter set of the legacy SRS symbol in the uplink subframe and an SRS parameter set of the additional SRS symbol in the uplink subframe are confirmed. For example, the SRS parameter set of the legacy SRS symbol and the SRS parameter set of the additional SRS symbol are respectively and independently determined according to fourth configuration signaling information. Independently determining here refers to that configuration of the SRS parameter set of the legacy SRS symbol and configuration of the SRS parameter set of the additional SRS symbol are independent from each other, so that the legacy SRS symbol and the additional SRS symbol can be independently managed.

According to the embodiment provided by the present disclosure, the first communication node device may carry configuration information of the SRS parameter sets in the fourth configuration signaling information, and send the fourth configuration signaling information to the second communication node device. The second communication node device may determine the SRS parameter set of the legacy SRS symbol in the uplink subframe and the SRS parameter set of the additional SRS symbol in the uplink subframe according to the configuration information of the SRS parameter sets carried in the fourth configuration signaling information.

According to the embodiment provided by the present disclosure, the SRS parameter set may include, but is not limited to, at least one of: a number of transmission combs, indexes of transmission combs, a sending bandwidth, a frequency modulation bandwidth, a cyclic shift parameter, a number of antenna ports and a starting location of an allocated physical resource block.

According to the embodiment provided by the present disclosure, the fourth configuration signaling information may include various downlink signalings sent by the first communication node device to the second communication node device. For example, the fourth configuration signaling information may include, but is not limited to, at least one of radio resource control (RRC) signaling and downlink control information (DCI) signaling.

According to the embodiment provided by the present disclosure, the SRS parameter set of the legacy SRS symbol and/or the SRS parameter set of the additional SRS symbol may also be predefined between the first communication node device and the second communication node device; or the SRS parameter set of the legacy SRS symbol and the SRS parameter set of the additional SRS symbol may be determined by a combination of predefinition and the fourth configuration information.

According to the embodiment provided by the present disclosure, formats and structures of the RRC signaling and DCI signaling may be determined through flexible selection. For example, in an example application scenario such as an LTE system, a physical downlink control channel (PDCCH) is configured to carry the DCI. The DCI may include uplink and downlink scheduling information, and uplink power control information. The DCI format includes DCI formats 0, 1, 1A, 1B, 1C, 1D, 2, 2A, 3, 3A, etc; and DCI formats 2B, 2C, and 2D are later added to evolved LTE-A Release 12 to support a variety of different applications and transmission modes. The format of the DCI signaling may be flexibly selected from the above-mentioned example formats according to requirements.

According to the embodiment provided by the present disclosure, the step in which the configuration information of the respective SRS symbols in the uplink subframe is determined according to the at least one of the configuration signaling information or the predefined rule may include, but is not limited to, that an SRS sequence generation manner of the legacy SRS symbol in the uplink subframe and an SRS sequence generation mode of the additional SRS symbol in the uplink subframe are determined.

For example, in an example embodiment, the SRS sequence generation manner of the legacy SRS symbol and the SRS sequence generation manner of the additional SRS symbol may be determined according to a predefined SRS sequence generation rule (the rule may be, but is not limited to, a predefined rule between the first communication node device and the second communication node device). The predefined SRS sequence generation rule may include, but is not limited to, at least one of that: an SRS sequence of the legacy SRS symbol is generated based on a physical cell identifier (PCID); or an SRS sequence of the additional SRS symbol is generated based on a virtual cell identifier (VCID) or an SRS sequence identifier (ID).

In this way, the SRS sequence generation manner used for the SRS on the last symbol in the uplink subframe in view of second communication node devices of different versions can be unified, so that SRS orthogonal multiplexing can be achieved on the last symbol in the uplink subframe in view of the second communication node devices of different versions. For example, SRS orthogonal multiplexing can be achieved on the last symbol in the uplink subframe in view of the second communication node device of Release 14 and the second communication node devices of Release 15 and of versions prior to Release 15.

According to the embodiment provided by the present disclosure, the SRS sequence generation rule is not limited to the two rules in the above examples. A flexible combination of the physical cell ID, the virtual cell ID, and the SRS sequence ID may also be used to determine the SRS sequence generation manner of the legacy SRS symbol and/or the SRS sequence generation manner of the additional SRS symbol according to requirements. According to the embodiment provided by the present disclosure, the virtual cell ID and/or the SRS sequence ID may be configured by the first communication node device, or may be obtained through other approaches.

According to the embodiment provided by the present disclosure, the SRS sequence generation manner of the legacy SRS symbol and the SRS sequence generation manner of the additional SRS symbol are not limited to be determined through a manner of predefinition by the first communication node device and the second communication node device, and may alternatively be dynamically configured through configuration signaling information, or be determined by a combination of the configuration signaling information and the predefinition.

For example, in some example embodiments, the step in which the configuration information of the respective SRS symbols in the uplink subframe is determined according to the at least one of the configuration signaling information or the predefined rule may include, but is not limited to, determining the SRS sequence generation manner of the legacy SRS symbol in the uplink subframe and/or the SRS sequence generation manner of the additional SRS symbol in the uplink subframe according to first configuration signaling information. The first configuration signaling information may include, but is not limited to, indication information for indicating a sequence generation manner for generating an SRS sequence based on the physical cell ID, the virtual cell ID, or the SRS sequence ID.

According to the embodiment provided by the present disclosure, the first communication node device may carry the indication information in first configuration signaling and send the first configuration signaling to the second communication node device, and the second communication node device may determine a corresponding SRS sequence generation manner of the legacy SRS symbol and/or a corresponding SRS sequence generation manner of the additional SRS symbol according to configuration information in the first configuration signaling.

According to the embodiment provided by the present disclosure, the first configuration signaling information may include, but is not limited to, at least one of: radio resource control (RRC) signaling; or downlink control information (DCI) signaling.

For example, in some example application scenarios, the first communication node device may indicate to the second communication node device through the RRC signaling or a physical downlink control signaling whether the SRS sequence is generated based on the physical cell ID, or based on the virtual cell ID or the SRS sequence ID. The virtual cell ID and/or the SRS sequence ID may be configured by the first communication node device. For example, the first communication node device may add one parameter to an RRC parameter set of the SRS, which is used to indicate whether the SRS sequence in the RRC parameter set is generated based on the physical cell ID, or based on the virtual cell ID or the SRS sequence ID. Therefore, the first communication node device may dynamically indicate through a downlink signaling whether the SRS sequence is generated based on the physical cell ID, or based on the virtual cell ID or the SRS sequence ID.

According to the embodiment provided by the present disclosure, the step in which the configuration information of the respective SRS symbols in the uplink subframe is determined according to the at least one of the configuration signaling information or the predefined rule may further include that: a symbol region applicable to the first configuration signaling information (that is, a dynamic selection manner of the SRS sequence) is determined. The symbol region includes, but is not limited to, at least one of: the last symbol in the uplink subframe; the last symbol in the uplink subframe conforming to an SRS period and a subframe offset; or the additional SRS symbol.

According to the embodiment provided by the present disclosure, the above-mentioned symbol region may be determined by a manner of predefinition between the first communication node device and the second communication node device.

According to the embodiment provided by the present disclosure, the above-mentioned symbol region may be determined through a manner of dynamic indication performed by the first communication node device (of course, may be performed by other devices) to the second communication node device.

In some example application scenarios, whether the last symbol in a sending subframe (that is, the uplink subframe) of traditional second communication node device (for example, including, but not limited to, the second communication node devices of Release 15 and of versions prior to Release 15) carries an SRS to send may be semi-statically configured through the RRC, or may be dynamically triggered by the DCI; therefore, in response to dynamic triggering being performed, the SRS sequence dynamic selection manner in the embodiment of the present disclosure may be used to avoid the problem of conflict of SRS sequences on the last symbol in the subframe between the second communication node device of Release 14 and the traditional second communication node device, so as to achieve the orthogonal multiplexing of the SRS sequences.

According to the embodiment provided by the present disclosure, the step in which the configuration information of the respective SRS symbols in the uplink subframe is determined according to the at least one of the configuration signaling information or the predefined rule may include, but is not limited to, determining an SRS frequency hopping pattern of the legacy SRS symbol and/or an SRS frequency hopping pattern of the additional SRS symbol in the uplink subframe.

For example, the first communication node device and the second communication node device may determine the SRS frequency hopping pattern of the legacy SRS symbol and/or the SRS frequency hopping pattern of the additional SRS symbol in the uplink subframe according to the predefined rule (that is, the predefinition between the first communication node device and the second communication node device). The first communication node device and the second communication node device may alternatively determine the SRS frequency hopping pattern of the legacy SRS symbol and/or the SRS frequency hopping pattern of the additional SRS symbol in the uplink subframe according to the configuration signaling information (for example, the configuration signaling information sent by the first communication node device to the second communication node device). Or, a combination of the predefinition and the configuration signaling information is adopted to determine the SRS frequency hopping pattern of the legacy SRS symbol in the uplink subframe and/or the SRS frequency hopping pattern of the additional SRS symbol in the uplink subframe.

According to the embodiment provided by the present disclosure, the step in which the SRS frequency hopping pattern of the legacy SRS symbol and/or the SRS frequency hopping pattern of the additional SRS symbol in the uplink subframe are determined according to the predefinition (that is, the predefined rule) between the first communication node device and the second communication node device may include that: in response to that the SRS sequence of the legacy SRS symbol is generated based on the physical cell ID, the legacy SRS symbol adopts a first SRS frequency hopping pattern, and the first SRS frequency hopping pattern may adopt, but is not limited to, an SRS frequency hopping pattern adopted by the second communication node devices of Release 15 and of versions prior to Release 15; in response to that the SRS sequence of the legacy SRS symbol is generated based on the virtual cell ID or the SRS sequence ID, the legacy SRS symbol adopts a second SRS frequency hopping pattern, and the second SRS frequency hopping pattern may be, but is not limited to, a pattern of performing SRS frequency hopping among multiple additional SRS symbols, that is, the second SRS frequency hopping pattern is consistent with the SRS frequency hopping pattern among additional SRS symbols.

According to the embodiment provided by the present disclosure, the SRS frequency hopping pattern adopted by the additional SRS symbol may be determined by, but is not limited to, the above-mentioned manner, or be directly configured and determined by other device. According to the method provided by the embodiment of the present disclosure, the SRS frequency hopping pattern of the legacy SRS symbol in the uplink subframe and/or the SRS frequency hopping pattern of the additional SRS symbol in the uplink subframe may be determined.

According to the embodiment provided by the present disclosure, the step in which the configuration information of the respective SRS symbols in the uplink subframe is determined according to the at least one of the configuration signaling information or the predefined rule may include, but is not limited to, determining a frequency hopping order of the legacy SRS symbol in the uplink subframe and/or a frequency hopping order of the additional SRS symbol in the uplink subframe.

For example, the first communication node device and the second communication node device may determine the frequency hopping order of the legacy SRS symbol and/or the frequency hopping order of the additional SRS symbol in the uplink subframe according to the predefined rule (that is, the predefinition between the first communication node device and the second communication node device). The first communication node device and the second communication node device may alternatively determine the frequency hopping order of the legacy SRS symbol and/or the frequency hopping order of the additional SRS symbol in the uplink subframe according to the configuration signaling information (for example, the configuration signaling information sent by the first communication node device to the second communication node device). Or, a combination of the predefinition and the configuration signaling information is adopted to determine the frequency hopping order of the legacy SRS symbol in the uplink subframe and/or the frequency hopping order of the additional SRS symbol in the uplink subframe.

According to the embodiment provided by the present disclosure, the frequency hopping order includes, but is not limited to, one of: hopping forward from the last symbol in the uplink subframe; or firstly hopping from the last symbol in the uplink subframe, and then hopping from front to back among symbols in the uplink subframe.

For ease of understanding, the embodiment of the present disclosure is described below in conjunction with a specific application scenario as an example for illustration.

Figure 2:
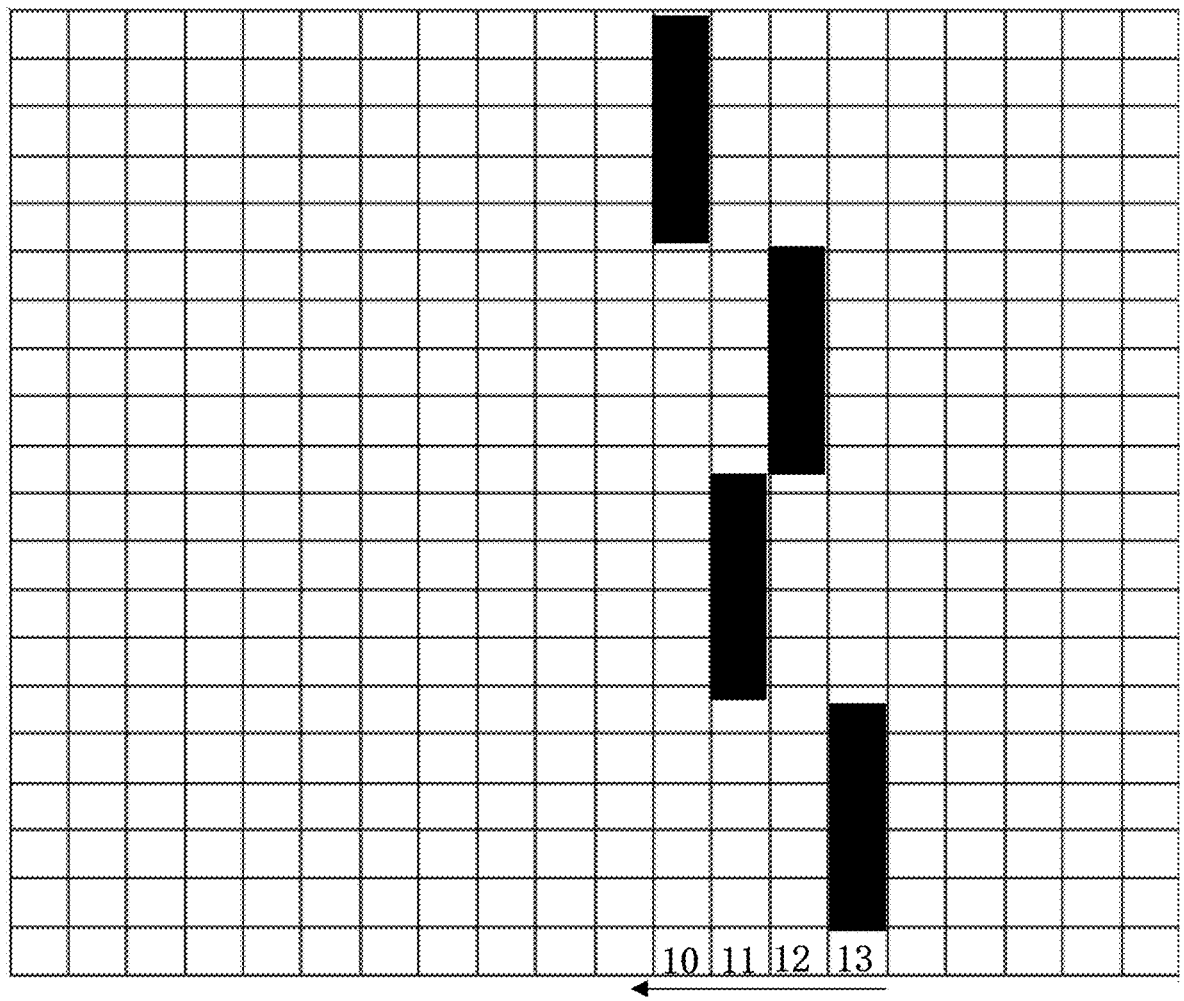
FIG. 2 is a schematic diagram of a frequency hopping order according to an embodiment of the present disclosure.

In some examples, for periodic SRS transmission or aperiodic SRS transmission, frequency hopping may be performed from the last symbol in the uplink subframe from back to front. For example, referring to FIG. 2, a configured SRS frequency domain location is used for symbol 13, and then the frequency hopping starts to move forward, that is, the arrow direction in FIG. 2 sequentially hops on symbol 13, symbol 12, symbol 11 and symbol 10. A user-specific SRS sending serial number sequentially increases on symbol 13, symbol 12, symbol 11, and symbol 10.

In an example scenario of LTE-A Release 10, in uplink communication, a non-precoded SRS, that is, an antenna-specific SRS may be used, while a demodulation reference signal (DMRS) in a physical uplink shared channel (PUSCH) is precoded. The first communication node device may estimate original uplink CSI by receiving the non-precoded SRS, and may not estimate the original uplink CSI through the precoded DMRS. At this time, in response to the second communication node device sending the non-precoded SRS by using multiple antennas, more SRS resources are required by each UE, which results in a decrease in the number of the second communication node devices that may be simultaneously multiplexed in the system. The second communication node device may send the SRS in two triggering manners, that is, through higher-layer signaling (also referred to as trigger type 0) or downlink control information (also referred to as trigger type 1). The periodic SRS may be triggered based on the higher-layer signaling, and the non-periodic SRS may be triggered based on the downlink control information.

In other examples of the embodiment, for the periodic SRS transmission or the aperiodic SRS transmission, frequency hopping may be performed through firstly hopping from the last symbol in the uplink subframe, and then hopping from front to back among symbols in the uplink subframe. For example, hopping may be sequentially performed on symbol 13, symbol 10, symbol 11, and symbol 12. The user-specific SRS sending serial number sequentially increases on symbol 13, symbol 10, symbol 11, and symbol 12.

According to the embodiment provided by the present disclosure, the frequency hopping order of the periodic SRS transmission or the aperiodic SRS transmission is not limited to the hopping order in the above examples.

According to the embodiment provided by the present disclosure, the step in which the configuration information of the respective SRS symbols in the uplink subframe is determined according to the at least one of the configuration signaling information or the predefined rule may include, but is not limited to, determining a frequency hopping manner of the legacy SRS symbol in the uplink subframe and/or a frequency hopping manner of the additional SRS symbol in the uplink subframe.

For example, the first communication node device and the second communication node device may determine the frequency hopping manner of the legacy SRS symbol and/or the frequency hopping manner of the additional SRS symbol in the uplink subframe according to the predefined rule (that is, the predefinition between the first communication node device and the second communication node device). The first communication node device and the second communication node device may alternatively determine the frequency hopping manner of the legacy SRS symbol and/or the frequency hopping manner of the additional SRS symbol in the uplink subframe according to the configuration signaling information (for example, the configuration signaling information sent by the first communication node device to the second communication node device). Or, a combination of the predefinition and the configuration signaling information is adopted to determine the frequency hopping manner of the legacy SRS symbol and/or the frequency hopping manner of the additional SRS symbol in the uplink subframe.

According to the embodiment provided by the present disclosure, the step in which the frequency hopping manner of the legacy SRS symbol and/or the frequency hopping manner of the additional SRS symbol in the uplink subframe are determined according to the at least one of the configuration signaling information or the predefined rule may include, but is not limited to, that, on the legacy SRS symbol, a first frequency hopping manner or a second frequency hopping manner is adopted; and on the additional SRS symbol, the second frequency hopping manner is adopted. The first frequency hopping manner is a manner of the SRS hopping among multiple subframes, and the second frequency hopping manner is a manner of the SRS hopping among multiple SRS symbols in one subframe.

For example, in an example application scenario, if the periodic SRS is on the last symbol in the subframe, that is, the periodic SRS is on the legacy SRS symbol, the first frequency hopping manner is adopted, for example, the frequency hopping is performed according to the manner of Release 15 LTE; if the periodic SRS is on the additional SRS symbol, the second frequency hopping manner is adopted, that is, a new frequency hopping manner is adopted for frequency hopping, and it will no longer hop back to the last symbol after hopping from the last symbol.

According to the embodiment provided by the present disclosure, for the above-mentioned second frequency hopping manner (that is, the new frequency hopping manner), an SRS frequency domain location may be determined through, but not limited to, at least one of that: (1) SRS frequency domain locations are respectively configured for respective additional SRS symbols through second configuration signaling (for example, the second configuration signaling includes, but is not limited to, any one of the RRC signaling and the DCI signaling) information; (2) an SRS frequency domain location parameter $n_{RRC}$ is configured for the legacy SRS symbol through the second configuration signaling information, an SRS frequency domain location $n_b$ of the SRS is determined based on the $n_{RRC}$ by a communication node device, and a frequency domain location of the additional SRS symbol is determined based on a predefined manner; (3) an SRS frequency domain location is configured for one additional SRS symbol through the second configuration signaling information, and SRS frequency domain locations of additional SRS symbols other than the one additional SRS symbol are obtained by a predefined manner.

According to the embodiment provided by the present disclosure, the predefined manner in (2) and/or (3) includes, but is not limited to, at least one of: obtaining through at least one of: an SRS frequency domain location, an offset value, an index of a time domain symbol where the SRS is located, a number of additional SRS symbols, a repetition factor, an SRS sending bandwidth $B_{SRS}$ satisfying that $B_{SRS} \in \{0,1,2,3\}$, an SRS hopping bandwidth $b_{hop}$ satisfying that $b_{hop} \in \{0,1,2,3\}$ or a user-specific SRS sending serial number of the legacy SRS symbol or the additional SRS symbol whose SRS frequency domain location is configured through the second configuration signaling information; or, setting a user-specific SRS sending serial number corresponding to the legacy SRS symbol or one symbol of additional SRS symbols whose SRS frequency location is configured through the second configuration signaling information to be $n_{SRS}$, predefining a user-specific SRS sending serial number corresponding to the additional SRS symbol or additional SRS symbols other than the one symbol as $n_{SRS}+k*M$ where $k=0,1,2,\ldots,N_{SRS}-1$, $N_{SRS}$ is a number of time domain symbols occupied by the additional SRS symbols, and M is an integer or $$M = \frac{SRS \text{ hopping frequency bandwidth}}{SRS \text{ sending bandwidth} * N_{SRS}/R},$$

where R is a repetition factor of the additional SRS symbols.

According to the method for transmitting an SRS provided by the embodiment of the present disclosure, the configuration and determination of the frequency hopping manner of the legacy SRS symbol and/or the frequency hopping manner of the additional SRS symbol in the uplink subframe can be achieved.

According to the embodiment provided by the present disclosure, the step in which the configuration information of the respective SRS symbols in the uplink subframe is determined according to the at least one of the configuration signaling information or the predefined rule may include, but is not limited to, that a time domain location of the additional SRS symbol in the uplink subframe is determined.

According to the embodiment provided by the present disclosure, the first communication node device and the second communication node device may determine the time domain location of the additional SRS symbol through third configuration signaling information. The time domain location may include, but is not limited to, one of: all time domain symbols on a first slot or a second slot of the uplink subframe; or all time domain symbols in the uplink subframe.

For example, in a specific application scenario, the first communication node device may indicate the time domain location of additional SRS symbol by using one (this number may be flexibly adjusted) bit in addition to indicating a cell-specific SRS period and the subframe offset in cell-specific SRS parameters.

According to the embodiment provided by the present disclosure, a time domain location of the legacy SRS symbol may be determined by, but is not limited to, the above-mentioned manner. It can be seen that, according to the SRS transmission method provided by the embodiment of the present disclosure, the determination of the time domain locations of the SRS symbols in the uplink subframe can be achieved.

According to the embodiment provided by the present disclosure, the step in which the configuration information of the respective SRS symbols in the uplink subframe is determined according to the at least one of the configuration signaling information or the predefined rule may include, but is not limited to, that an order between frequency hopping and antenna switching of SRS symbols in the uplink subframe is determined.

For example, the first communication node device and the second communication node device may determine the order between the frequency hopping and the antenna switching of the SRS symbols in the uplink subframe according to the predefined rule (that is, the predefinition between the first communication node device and the second communication node device). The first communication node device and the second communication node device may alternatively determine the order between the frequency hopping and the antenna switching of the SRS symbols in the uplink subframe according to the configuration signaling information (for example, the configuration signaling information sent by the first communication node device to the second communication node device). Or, a combination of the predefinition and the configuration signaling information is adopted to determine the order between the frequency hopping and the antenna switching of the SRS symbols in the uplink subframe.

According to the embodiment provided by the present disclosure, the order between the frequency hopping and the antenna switching includes, but is not limited to, one of that: the frequency hopping is performed and then the antenna switching is performed on multiple SRS symbols; or the antenna switching is performed and then the frequency hopping is performed on the multiple SRS symbols. The multiple SRS symbols are divided into multiple groups, SRS sending ports on SRS symbols in one group have a same index, and SRS sending ports on SRS symbols in adjacent groups have different indexes.

According to the embodiment provided by the present disclosure, a gap may be reserved during the antenna switching, and the size of the gap may be one symbol or multiple symbols, etc., which, specifically, may be flexibly determined according to specific application scenarios (for example, including, but not limited to, a sub-carrier space used by a UE).

Figure 3:
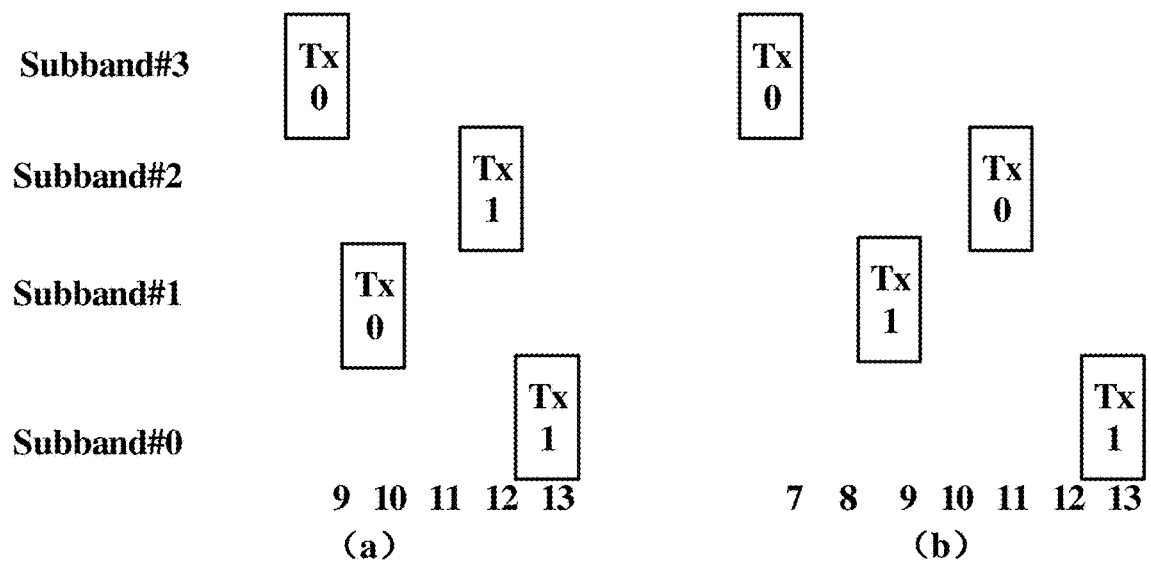
FIG. 3 is a schematic diagram of a pattern of antenna switching and frequency hopping according to an embodiment of the present disclosure.

For ease of understanding, the pattern of antenna switching and frequency hopping shown in FIG. 3 is taken as an example for illustration. In FIG. 3, antenna configuration of the UE is 1T2R, and frequency hopping is performed on 4 different subbands (Subband#0 to Subband#3) in one subframe. Since the guard interval required by pattern a hopping is less than the guard interval required by pattern b hopping, pattern a hopping is superior to pattern b hopping. Therefore, in general, for the antenna configuration of xTyR of the UE, the number of configured SRS symbols needs to be a multiple of y/x, so that N SRS symbols can be divided into y/x groups, N/(y/x) symbols in each group are adjacent and used for SRS sending using the same antenna port. Since adjacent groups use different antenna ports, a guard interval of one or more symbols needs to be reserved between symbol groups. As shown in pattern (a) in FIG. 3, xTyR=1T2R, N=4, so that 4 SRS symbols are divided into two groups, the first group includes symbol 9 and symbol 10, the SRS is sent by using Tx0; and the second group includes symbol 12 and symbol 13, the SRS is sent by using Tx1. Symbol 11 is reserved as a guard interval.

An embodiment of the present disclosure further provides an SRS transmission device. The SRS transmission device may be configured on a first communication node device and a second communication node device. The SRS transmission device on the first communication node device may be configured to implement the function corresponding to the SRS transmission method on the side of the first communication node device; the SRS transmission device on the second communication node device may be configured to implement the function corresponding to the SRS transmission method on the side of the second communication node device.

Figure 4:
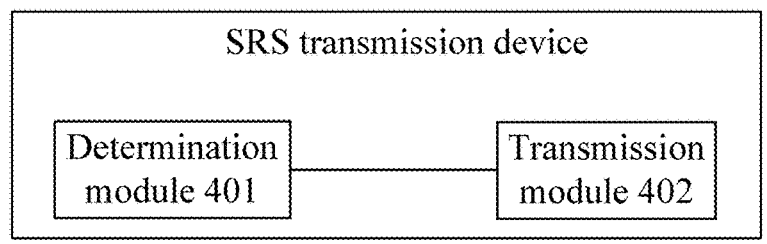
FIG. 4 is a structure diagram of an SRS transmission device according to an embodiment of the present disclosure.

As shown in FIG. 4, according to an embodiment provided by the present disclosure, the SRS transmission device may include a determination module 401 and a transmission module 402.

The determination module 401 is configured to determine, according to at least one of configuration signaling information or a predefined rule, configuration information of respective SRS symbols in an uplink subframe.

According to the embodiment provided by the present disclosure and according to specific requirements, the determination module 401 may flexibly determine the configuration information of the respective SRS symbols in the uplink subframe according to the configuration signaling information; the determination module 401 may alternatively flexibly determine the configuration information of the respective SRS symbols in the uplink subframe according to the predefined rule; or the determination module 401 determines the configuration information of the respective SRS symbols in the uplink subframe according to the configuration signaling information and the predefined rule.

According to the embodiment provided by the present disclosure, in response to the determination module 401 being configured to determine the configuration information of the respective SRS symbols in the uplink subframe according to the predefined rule, the predefined rule may be a pre-negotiated (that is, pre-defined) rule between a first communication node device and a second communication node device.

According to the embodiment provided by the present disclosure, in response to the determination module 401 being configured to determine the configuration information of the respective SRS symbols in the uplink subframe according to the configuration signaling information, the configuration signaling information may be configuration signaling information sent by the first communication node device to the second communication node device, and the specific type of the configuration signaling information may also be flexibly selected according to specific application scenarios.

The transmission module 402 is configured to transmit the SRS symbols according to the configuration information.

For example, for the SRS transmission device on the second communication node device, the transmission module 402 may send the SRS symbols to the first communication node device according to the configuration information; and for the SRS transmission device on the first communication node device, the transmission module 402 may receive the SRS symbols sent by the second communication node device according to the configuration information. According to the embodiment provided by the present disclosure, after receiving the SRS symbols, the first communication node device may further perform corresponding processing on the SRS symbols.

In some application examples (such as LTE-A Release 14, but not limited to LTE-A Release 14), the SRS symbols in the uplink subframe may include, but is not limited to, a legacy SRS symbol and an additional SRS symbol.

According to the embodiment provided by the present disclosure, the legacy SRS symbol is an SRS symbol on a last symbol (in some example embodiments, the last symbol may be a data symbol) in the uplink subframe; and the additional SRS symbol is an SRS symbol on a symbol (in some example embodiments, the another symbol may be a data symbol) other than the last symbol in the uplink subframe.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 determines an SRS sequence generation manner of the legacy SRS symbol and an SRS sequence generation manner of the additional SRS symbol, according to a pre-defined SRS sequence generation rule.

For example, in an example embodiment, the predefined SRS sequence generation rule may include, but is not limited to, at least one of that: an SRS sequence of the legacy SRS symbol is generated based on a physical cell ID; an SRS sequence of the additional SRS symbol is generated based on a virtual cell ID or an SRS sequence ID.

According to the embodiment provided by the present disclosure, the determination module 401 determining the configuration information of the respective SRS symbols in the uplink subframe according to the at least one of the configuration signaling information or the predefined rule may include, but is not limited to, that: the determination module 401 determines the SRS sequence generation manner of the legacy SRS symbol and/or the SRS sequence generation manner of the additional SRS symbol in the subframe according to first configuration signaling information. The first configuration signaling information includes, but is not limited to, indication information for indicating a sequence generation manner for generating an SRS sequence based on the physical cell ID, the virtual cell ID, or the SRS sequence ID.

According to the embodiment provided by the present disclosure, the first configuration signaling information includes, but is not limited to, at least one of: radio resource control (RRC) signaling; or downlink control information (DCI) signaling.

According to the embodiment provided by the present disclosure, the determination module 401 may further be configured to determine a symbol region applicable to the first configuration signaling information. The symbol region may include, but is not limited to, at least one of: the last symbol in the uplink subframe; the last symbol in the uplink subframe conforming to an SRS period and a subframe offset; or the additional SRS symbol.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 determines an SRS frequency hopping pattern of the legacy SRS symbol and/or an SRS frequency hopping pattern of the additional SRS symbol in the uplink subframe according to the at least one of the configuration signaling information or the predefined rule.

For example, the determination module 401 determining the SRS frequency hopping pattern of the legacy SRS symbol and/or the SRS frequency hopping pattern of the additional SRS symbol in the uplink subframe according to the at least one of the configuration signaling information or the predefined rule includes, but is not limited to, that: in response to that the SRS sequence of the legacy SRS symbol is generated based on the physical cell ID, the legacy SRS symbol adopts a first SRS frequency hopping pattern, and for example, the first SRS frequency hopping pattern may adopt, but is not limited to, an SRS frequency hopping pattern adopted by the second communication node devices of Release 15 and of versions prior to Release 15; in response to that the SRS sequence of the legacy SRS symbol is generated based on the virtual cell ID or the SRS sequence ID, the legacy SRS symbol adopts a second SRS frequency hopping pattern, and for example, the second SRS frequency hopping pattern may be, but is not limited to, a pattern of performing SRS frequency hopping among multiple additional SRS symbols, that is, the second SRS frequency hopping pattern is consistent with the SRS frequency hopping pattern among additional SRS symbols.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 determines a frequency hopping order of the legacy SRS symbol and a frequency hopping order of the additional SRS symbol in the uplink subframe according to the at least one of the configuration signaling information or the predefined rule.

According to the embodiment provided by the present disclosure, the frequency hopping order includes, but is not limited to: hopping forward from the last symbol in the uplink subframe; or firstly hopping from the last symbol in the uplink subframe, and then hopping from front to back among symbols in the uplink subframe.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 determines a frequency hopping manner of the legacy SRS symbol and/or a frequency hopping manner of the additional SRS symbol in the uplink subframe according to the at least one of the configuration signaling information or the predefined rule.

According to the embodiment provided by the present disclosure, the determination module 401 is configured to, on the legacy SRS symbol, adopt a first frequency hopping manner or a second frequency hopping manner; and on the additional SRS symbol, adopt the second frequency hopping manner. The first frequency hopping manner is a manner of the SRS hopping among multiple subframes, and the second frequency hopping manner is a manner of the SRS hopping among multiple symbols in one subframe.

According to the embodiment provided by the present disclosure, in response to the determination module 401 determining to adopt the second frequency hopping manner (that is, a new frequency hopping manner), the determination module 401 may determine an SRS frequency domain location through, but not limited to, at least one of that: (1) SRS frequency domain locations are respectively configured for the respective additional SRS symbols through the second configuration signaling (for example, the second configuration signaling includes, but is not limited to, any one of the RRC signaling and the DCI signaling) information; (2) an SRS frequency domain location parameter $n_{RRC}$ is configured for the legacy SRS symbol through the second configuration signaling information, an SRS frequency domain location $n_{RRC}$ of the SRS is determined based on the $n_b$ by a communication node device, and a frequency domain location of the additional SRS symbol is determined based on a predefined manner; or (3) an SRS frequency domain location is configured for one additional SRS symbol through the second configuration signaling information, and SRS frequency domain locations of additional SRS symbols other than the one additional SRS symbol are obtained by a predefined manner.

According to the embodiment provided by the present disclosure, the predefined manner in (2) and/or (3) includes, but is not limited to, at least one of: obtaining, through at least one of an SRS frequency domain location, an offset value, an index of a time domain symbol where the SRS is located, a number of additional SRS symbols, a repetition factor, an SRS sending bandwidth $B_{SRS}$ satisfying that $B_{SRS} \in \{0,1,2,3\}$, an SRS hopping bandwidth $b_{hop}$ satisfying that $b_{hop} \in \{0,1,2,3\}$ and a user-specific SRS sending serial number of the legacy SRS symbol or the additional SRS symbol whose SRS frequency domain location is configured through the second configuration signaling information; or, setting a user-specific SRS sending serial number corresponding to the legacy SRS symbol or one symbol of additional SRS symbols whose SRS frequency location is configured through the second configuration signaling information to be $n_{SRS}$, and predefining a user-specific SRS sending serial number corresponding to the additional SRS symbol or additional SRS symbols other than the one symbol as $n_{SRS}+k*M$, where $k=0,1,2,\ldots,N_{SRS}-1$, $N_{SRS}$ is a number of time domain symbols occupied by the additional SRS symbols, and M is an integer or $$M = \frac{SRS \text{ hopping frequency bandwidth}}{SRS \text{ sending bandwidth} * N_{SRS}/R},$$

where R is a repetition factor of the additional SRS symbols.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 determines a time domain location of the additional SRS symbol through third configuration signaling information.

According to the embodiment provided by the present disclosure, the time domain location may include, but is not limited to, one of: all time domain symbols on a first slot or a second slot of the uplink subframe; or all time domain symbols in the uplink subframe.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 determines an order between frequency hopping and antenna switching of SRS symbols in the uplink subframe. The order between the frequency hopping and the antenna switching includes, but is not limited to, one of that: the frequency hopping is performed and then the antenna switching is performed on multiple SRS symbols; or the antenna switching is performed and then the frequency hopping is performed on the multiple SRS symbols. The multiple SRS symbols are divided into multiple groups, SRS sending ports on SRS symbols in one group have a same index, and SRS sending ports on SRS symbols in adjacent groups have different indexes.

According to the embodiment provided by the present disclosure, the determination module 401 determining the configuration information of the respective SRS symbols in the uplink subframe according to the at least one of the configuration signaling information or the predefined rule may include, but is not limited to, that the determination module 401 respectively and independently determines an SRS parameter set of the legacy SRS symbol and an SRS parameter set of the additional SRS symbol according to fourth configuration signaling information. Independently determining here refers to that configuration of the SRS parameter set of the legacy SRS symbol and configuration of the SRS parameter set of the additional SRS symbol are independent from each other, so that the legacy SRS symbol and the additional SRS symbol can be independently managed.

According to the embodiment provided by the present disclosure, the SRS parameter set may include at least one of: a number of transmission combs, indexes of transmission combs, a sending bandwidth, a frequency modulation bandwidth, a cyclic shift parameter, a number of antenna ports and a starting location of an allocated physical resource block.

According to the embodiment of the present disclosure, the fourth configuration signaling information may be various downlink signaling sent by the first communication node device to the second communication node device. For example, the fourth configuration signaling information may include, but is not limited to, at least one of the RRC signaling and the DCI signaling.

According to the embodiment provided by the present disclosure, the SRS parameter set of the legacy SRS symbol and/or the SRS parameter set of the additional SRS symbol may alternatively be predefined between the first communication node device and the second communication node device; or the SRS parameter set of the legacy SRS symbol and the SRS parameter set of the additional SRS symbol may be determined by a combination of predefinition and the fourth configuration information.

According to the SRS transmission device provided by the embodiment of the present disclosure, the configuration information of the legacy SRS symbol and additional SRS symbol in the uplink subframe may be determined between the first communication node device and the second communication node device through the at least one of the configuration signaling information or the predefined rule, and the legacy SRS symbol and additional SRS symbol in the uplink subframe may be received and sent based on determined configuration information respectively, so as to satisfy the requirement of introducing multiple SRS symbols into one uplink subframe to enhance the capacity and coverage of the SRS.

Figure 5:
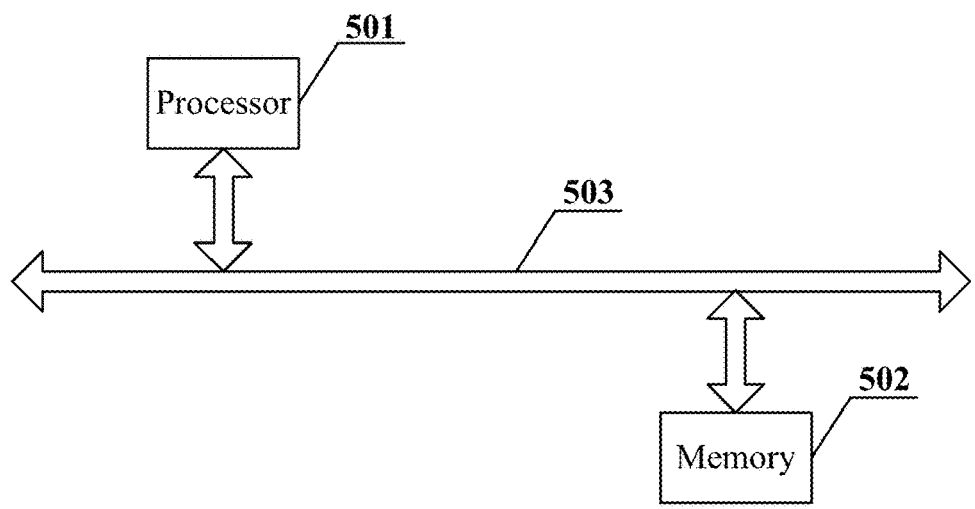
FIG. 5 is a structural diagram of a communication node device according to an embodiment of the present disclosure.

An embodiment of the present disclosure further provides a communication node device, and the communication node device may be a first communication node device or a second communication node device. As shown in FIG. 5, the communication node device may include a processor 501, a memory 502 and a communication but 503.

The communication bus 503 is configured to implement communication connection between the processor 501 and the memory 502.

According to the embodiment provided by the present disclosure, the processor 501 may be configured to execute one or more computer programs stored in the memory 502 to implement the steps of the SRS transmission method provided by the embodiment of the present disclosure.

The embodiment of the present disclosure further provides a computer-readable storage medium. The computer-readable storage medium includes a volatile or nonvolatile medium or a removable or non-removable medium implemented in any method or technology for storing information (such as computer-readable instructions, data structures, computer program modules or other data). The computer-readable storage medium includes, but is not limited to, a random access memory (RAM), a read-only memory (ROM), an electrically erasable programmable read only memory (EEPROM), a flash memory or other memory technologies, a compact disc read-only memory (CD-ROM), a digital versatile disc (DVD) or other optical disc storage, a magnetic cassette, a magnetic tape, magnetic disk, or other magnetic storage devices, or any other medium that may be used for storing desired information and that may be accessed by a computer.

According to an embodiment of the present disclosure, the computer-readable storage medium may be configured to store one or more computer programs. The one or more computer programs are executable by one or more processors to implement the steps of the SRS transmission method provided by the embodiment of the present disclosure.

The embodiment further provides a computer program (or computer software) which may be distributed on a computer-readable medium and executed by a computing device to implement at least one step of the SRS transmission method provided by the embodiment of the present disclosure. In some circumstances, the at least one step illustrated or described may be executed in sequences different from those described in the embodiments described above.

The embodiment further provides a computer program product. The computer program product includes a computer-readable device on which the preceding computer program is stored. In the embodiment provided by the present disclosure, the computer-readable device may include the computer-readable storage medium illustrated above.

It can be seen that those skilled in the art should understand that all or part of the steps of the method and functional modules/units in the system and the device disclosed above may be implemented as software (which may be implemented by computer program codes executable by a computing device), firmware, hardware, and appropriate combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present disclosure is not limited to any particular combination of hardware and software.

The above is a more detailed description of embodiments of the present disclosure in conjunction with implementations and is not to be construed as limiting embodiments of the present application. For those having ordinary skill in the art to which the present disclosure pertains, simple deductions or substitutions may be made without departing from the concept of the present application and are considered to fall within the scope of the present disclosure.

What is claimed is:

1. A sounding reference signal (SRS) transmission method, comprising:
determining, according to at least one of configuration signaling information or a predefined rule, configuration information of respective SRS symbols in an uplink subframe; and
transmitting, according to the configuration information, the respective SRS symbols;
wherein one of the respective SRS symbols in the uplink subframe comprises at least one of a legacy SRS symbol or an additional SRS symbol;

wherein the legacy SRS symbol is located on a last symbol in the uplink subframe, and the additional SRS symbol is located on a symbol other than the last symbol in the uplink subframe, wherein determining, according to the at least one of the configuration signaling information or the predefined rule, the configuration information of the respective SRS symbols in the uplink subframe comprises:

determining, according to the at least one of the configuration signaling information or the predefined rule, a frequency hopping manner of the legacy SRS symbol and/or a frequency hopping manner of the additional SRS symbol;

wherein the frequency hopping manner comprises:

on the legacy SRS symbol, adopting a first frequency hopping manner or a second frequency hopping manner; and on the additional SRS symbol, adopting the second frequency hopping manner;

wherein the first frequency hopping manner is a manner of hopping among a plurality of subframes, and the second frequency hopping manner is a manner of hopping among a plurality of symbols in one subframe, wherein determining, according to the at least one of the configuration signaling information or the predefined rule, the configuration information of the respective SRS symbols in the uplink subframe comprises: in response to determining that the second frequency hopping manner is adopted, determining an SRS frequency domain location through determining, based on a predefined manner, an SRS frequency domain location of the additional SRS symbol, wherein the predefined manner comprises:

setting a user-specific SRS sending serial number corresponding to the legacy SRS symbol or one symbol of additional SRS symbols whose SRS frequency location is configured through the second configuration signaling information to be $n_{SRS}$, and predefining a user-specific SRS sending serial number corresponding to the additional SRS symbol or additional SRS symbols other than the one symbol as $n_{SRS}+k*M$, wherein $k=0,1,2,\ldots,N_{SRS}-1$, $N_{SRS}$ is a number of time domain symbols occupied by the additional SRS symbols, and M is an integer or $$M = \frac{SRS \text{ hopping frequency bandwidth}}{SRS \text{ sending bandwidth} * N_{SRS}/R},$$

wherein R is a repetition factor of the additional SRS symbols.

2. The method according to claim 1, wherein determining, according to the at least one of the configuration signaling information or the predefined rule, the configuration information of the respective SRS symbols in the uplink subframe comprises:

determining, according to a predefined SRS sequence generation rule, an SRS sequence generation manner of the legacy SRS symbol and an SRS sequence generation manner of the additional SRS symbol.

3. The method according to claim 2, wherein the predefined SRS sequence generation rule comprises at least one of:

an SRS sequence of the legacy SRS symbol being generated based on a physical cell identifier; or an SRS sequence of the additional SRS symbol being generated based on a virtual cell identifier or an SRS sequence identifier.

4. The method according to claim 1, wherein determining, according to the at least one of the configuration signaling information or the predefined rule, the configuration information of the respective SRS symbols in the uplink subframe comprises:

determining, according to first configuration signaling information, an SRS sequence generation manner of the legacy SRS symbol and/or an SRS sequence generation manner of the additional SRS symbol;

wherein the first configuration signaling information comprises indication information for indicating a sequence generation manner for generating an SRS sequence based on a physical cell identifier, and/or a virtual cell identifier or an SRS sequence identifier;

wherein the first configuration information comprises at least one of:

radio resource control (RRC) signaling; or downlink control information (DCI) signaling.

5. The method according to claim 1, wherein determining, according to the at least one of the configuration signaling information and/or the predefined rule, the configuration information of the respective SRS symbols in the uplink subframe comprises:

determining, according to the at least one of the configuration signaling information or the predefined rule, an SRS frequency hopping pattern of the legacy SRS symbol and/or an SRS frequency hopping pattern of the additional SRS symbol.

6. The method according to claim 5, wherein determining, according to the at least one of the configuration signaling information or the predefined rule, the SRS frequency hopping pattern of the legacy SRS symbol and/or the SRS frequency hopping pattern of the additional SRS symbol comprises:

in response to determining that the SRS sequence of the legacy SRS symbol is generated based on the physical cell identifier, determining that the legacy SRS symbol adopts a first SRS frequency hopping pattern;

in response to determining that the SRS sequence of the legacy SRS symbol is generated based on the virtual cell identifier or the SRS sequence identifier, determining that the legacy SRS symbol adopts a second SRS frequency hopping pattern.

7. The method according to claim 6, wherein the second SRS frequency hopping pattern is a pattern of performing SRS frequency hopping among a plurality of additional SRS symbols.

8. The method according to claim 1, wherein determining, according to the at least one of the configuration signaling information or the predefined rule, the configuration information of the respective SRS symbols in the uplink subframe comprises:

determining, according to the at least one of the configuration signaling information or the predefined rule, a frequency hopping order of the legacy SRS symbol and/or a frequency hopping order of the additional SRS symbol;

wherein the frequency hopping order comprises: hopping forward from the last symbol in the uplink subframe; or firstly hopping from the last symbol in the uplink subframe, and then hopping from front to back among symbols other than the last symbol in the uplink subframe.

9. The method according to claim 1, wherein determining, according to the at least one of the configuration signaling information or the predefined rule, the configuration information of the respective SRS symbols in the uplink subframe comprises: in response to determining that the second frequency hopping manner is adopted, determining an SRS frequency domain location further through at least one of:
- determining, according to second configuration signaling information, an SRS frequency domain location of the additional SRS symbol; or
- determining, according to second configuration signaling information, an SRS frequency domain location parameter $n_{RRC}$ of the legacy SRS symbol, and determining, based on the $n_{RRC}$, an SRS frequency domain location $n_b$ of the legacy SRS symbol.

10. The method according to claim 1, wherein the predefined manner further comprises:
- obtaining, through at least one of an SRS frequency domain location, an offset value, an index of a time domain symbol where the SRS is located, a number of additional SRS symbols, a repetition factor, an SRS sending bandwidth $B_{SRS}$ satisfying that $B_{SRS} \in \{0,1,2,3\}$, an SRS hopping bandwidth $b_{hop}$ satisfying that $b_{hop} \in \{0,1,2,3\}$ and a user-specific SRS sending serial number of the legacy SRS symbol or the additional SRS symbol whose SRS frequency domain location is configured through the second configuration signaling information.

11. The method according to claim 1, wherein determining, according to the at least one of the configuration signaling information or the predefined rule, the configuration information of the respective SRS symbols in the uplink subframe comprises:
- determining, through third configuration signaling information, a time domain location of the additional SRS symbol;
- wherein the time domain location comprises:
  - all time domain symbols on a first slot or a second slot of the uplink subframe; or
  - all time domain symbols in the uplink subframe.

12. The method according to claim 1, wherein determining, according to the at least one of the configuration signaling information or the predefined rule, the configuration information of the respective SRS symbols in the uplink subframe comprises: determining an order between frequency hopping and antenna switching of the respective SRS symbols in the uplink subframe;
- wherein the order between the frequency hopping and the antenna switching comprises:
- performing frequency hopping and then performing antenna switching on a plurality of SRS symbols; or
- performing antenna switching and then performing frequency hopping on a plurality of SRS symbols;
- wherein the plurality of SRS symbols are divided into a plurality of groups, SRS sending ports on SRS symbols in any one of the plurality of groups have a same index, and SRS sending ports on SRS symbols in any adjacent two of the plurality of groups have different indexes.

13. The method according to claim 1, wherein determining, according to the at least one of the configuration signaling information or the predefined rule, the configuration information of the respective SRS symbols in the uplink subframe comprises:
- respectively and independently determining, according to fourth configuration signaling information, an SRS parameter set of the legacy SRS symbol and an SRS parameter set of the additional SRS symbol;
- wherein the SRS parameter set comprises at least one of: a number of transmission combs, indexes of transmission combs, a sending bandwidth, a frequency modulation bandwidth, a cyclic shift parameter, a number of antenna ports or a starting location of an allocated physical resource block.

14. A communication node device, comprising a processor, a memory, and a communication bus; wherein
- the communication bus is configured to connect the processor and the memory; and
- the processor is configured to execute a computer program stored in the memory to implement steps of the SRS transmission method of claim 1.

15. A non-transitory computer-readable storage medium, which is configured to store one or more computer programs executable by one or more processors to implement steps of the SRS transmission method of claim 1.

* * * * *